United States Patent
Carroll et al.

(10) Patent No.: US 11,352,200 B2
(45) Date of Patent: Jun. 7, 2022

(54) TRANSPORT OF POWDERS

(71) Applicant: LPW TECHNOLOGY LTD., Runcorn (GB)

(72) Inventors: Philip Carroll, Runcorn (GB); Ben Ferrar, Runcorn (GB); Robert Deffley, Sheffield (GB)

(73) Assignee: LPW TECHNOLOGY LTD., Runcorn (GB)

( * ) Notice: Subject to any disclaimer, the term of this patent is extended or adjusted under 35 U.S.C. 154(b) by 209 days.

(21) Appl. No.: 15/513,786

(22) PCT Filed: Sep. 23, 2015

(86) PCT No.: PCT/GB2015/052744
§ 371 (c)(1),
(2) Date: Mar. 23, 2017

(87) PCT Pub. No.: WO2016/046539
PCT Pub. Date: Mar. 31, 2016

(65) Prior Publication Data
US 2017/0297813 A1    Oct. 19, 2017

(30) Foreign Application Priority Data

Sep. 24, 2014    (GB) .................................... 1416850

(51) Int. Cl.
*B65D 88/28*    (2006.01)
*B65D 90/48*    (2006.01)
(Continued)

(52) U.S. Cl.
CPC .............. *B65D 88/28* (2013.01); *B22F 10/00* (2021.01); *B22F 12/00* (2021.01); *B33Y 30/00* (2014.12);
(Continued)

(58) Field of Classification Search
CPC .. B65B 1/16; B65B 1/28; B65G 53/66; B65G 69/183; B65D 88/66; B65D 81/20; B65D 81/2076; B65D 88/30
See application file for complete search history.

(56) References Cited

U.S. PATENT DOCUMENTS 3,209,675 A * 10/1965 Stimpson ................. B61D 5/00
99/473
3,223,457 A    12/1965 Albert
(Continued)

FOREIGN PATENT DOCUMENTS

CN          200995880 Y    12/2007
DE          3410721 A1     10/1985
(Continued)

OTHER PUBLICATIONS

Machine English Translation of JP57-166225A, retrieved on Jun. 8, 2019 (Year: 2019).*
(Continued)

*Primary Examiner* — Timothy P. Kelly
(74) *Attorney, Agent, or Firm* — Adler Pollock & Sheehan P.C

(57) ABSTRACT

A powder container (10) comprising a pressure vessel (12) for containing a quantity of powder (14) and a quantity of pressurised gas (32), an outlet through which, in use, the powder (14) can flow out of the pressure vessel (12), and an outlet valve (24) for selectively opening and closing the outlet, wherein the container (10) further comprises a data sensing and/or logging means (56, 58, 60, 62, 64) adapted to monitor and/or log various parameters of the powder (14) and/or the pressurised gas (32) and further comprising a control unit (54) adapted record and log the sensor readings either continuously, or at intervals, the control unit (54)
(Continued)

comprising a communications module adapted to relay sensor readings, or log files, to a remote monitoring station.

16 Claims, 3 Drawing Sheets

(51) Int. Cl.
| | | |
|---|---|---|
| *B65D 88/74* | (2006.01) | |
| *B22F 12/00* | (2021.01) | |
| *B22F 10/00* | (2021.01) | |
| *B33Y 30/00* | (2015.01) | |
| *B33Y 40/00* | (2020.01) | |
| *B33Y 50/00* | (2015.01) | |
| B65G 53/66 | (2006.01) | |
| B65G 69/18 | (2006.01) | |
| B22F 10/10 | (2021.01) | |

(52) U.S. Cl.
CPC .............. *B33Y 40/00* (2014.12); *B33Y 50/00* (2014.12); *B65D 88/745* (2013.01); *B65D 90/48* (2013.01); *B22F 10/10* (2021.01); *B65D 2590/0083* (2013.01); *B65G 53/66* (2013.01); *B65G 69/183* (2013.01); *B65G 2203/042* (2013.01); *Y02P 10/25* (2015.11)

(56) References Cited

U.S. PATENT DOCUMENTS

| | | | | |
|---|---|---|---|---|
| 4,153,304 | A * | 5/1979 | Haskins | B65G 53/22 |
| | | | | 406/126 |
| 9,919,816 | B2 * | 3/2018 | Tenegal | B65G 69/183 |
| 2008/0050286 | A1 | 2/2008 | Elliott et al. | |
| 2008/0196942 | A1 | 8/2008 | Bingham et al. | |
| 2011/0182675 | A1 * | 7/2011 | Mortensen | B65D 81/2076 |
| | | | | 406/197 |
| 2012/0276262 | A1 | 11/2012 | Schrader et al. | |
| 2013/0002443 | A1 | 1/2013 | Breed et al. | |
| 2015/0114996 | A1 * | 4/2015 | Gallagher | B65B 1/28 |
| | | | | 222/152 |
| 2017/0313499 | A1 * | 11/2017 | Hughes | B60P 1/483 |
| 2021/0138553 | A1 * | 5/2021 | Ferrar | B33Y 40/00 |

FOREIGN PATENT DOCUMENTS

| | | | |
|---|---|---|---|
| DE | 9015828 U1 | 2/1991 | |
| DE | 202005016035 U1 | 1/2006 | |
| GB | 1296736 A | 11/1972 | |
| GB | 1362509 A * | 8/1974 | ............ B65G 53/22 |
| GB | 2436097 A | 9/2007 | |
| JP | 57166225 A * | 10/1982 | ............ B65D 90/44 |
| JP | H1159786 A | 3/1999 | |
| JP | 2008239243 A | 10/2008 | |
| KR | 20110130003 A | 12/2011 | |
| WO | 99/23016 A1 | 5/1999 | |
| WO | WO-03040666 A1 | 5/2003 | |

OTHER PUBLICATIONS

Olga Soloman, Ulf Svanberg, & Annika Sahistrom, "Effect of Oxygen and Fluorescent Light on the Quality of Orange Juice During Storage at 8C", Sep. 29, 1994, Elsevier, Food Chemistry, 363-368 (Year: 1994).*

Hall, Aaron Christopher. Powder Safety Awareness for Additive Manufacturing.. United States: N. p., Oct. 28-30, 2014. Web. (Year: 2014).*

International Search Report and Written opinion received in International Application No. PCT/GB2015/052744, dated Mar. 29, 2016, 14 pages.

International Search Report and Written Opinion received in International Application No. PCT/GB2015/052750, dated Feb. 29, 2016, 13 pages.

* cited by examiner

TRANSPORT OF POWDERS

CROSS REFERENCE TO RELATED APPLICATIONS

This application is a national phase filing under 35 U.S.C. § 371 of International Application No. PCT/GB2015/052744 filed Sep. 23, 2015, which claims priority from Great Britain application number 1416850.4, filed Sep. 24, 2014, the entire contents of each are hereby incorporated by reference herein.

This invention relates to an apparatus and method for storing and transporting powders.

The storage and transportation of specialist powders, such as those used in additive manufacturing (AM) processes requires careful consideration if the powder is to arrive at its destination in a useable condition. Currently, AM powders (e.g. sub-micron metal powders) are alloyed and milled at a powder manufacturing facility before being packed, under controlled atmosphere conditions, into airtight containers. The individual, sealed containers are typically uniquely identifiable, for example, using a barcode, RFID tag or the like and are warehoused prior to transportation to their final dentation.

Existing storage and transportations methods, such as the use of barcoded airtight containers, can be prone to damage, tampering and ageing, and so it is not, at present, possible to guarantee the quality of the powder at its final destination. In high tech manufacturing, such as AM, contamination, batch variations and poor quality powders are unacceptable. A need therefore exists for an improved and/or an alternative packaging, storage and transportation system for AM powders.

This invention aims to provide a solution to one or more problems associated with the storage and transportation of powders, and various aspects of the invention are set forth in the appendent claims.

An aspect of the invention provides a powder container comprising a pressure vessel for containing a quantity of powder and a quantity of pressurised gas, an outlet through which, in use, the powder can flow out of the pressure vessel, and an outlet valve for selectively opening and closing the outlet, wherein the container further comprises a data sensing and/or logging means adapted to monitor and/or log various parameters of the powder and/or the pressurised gas and further comprising a control unit adapted record and log the sensor readings either continuously, or at intervals, the control unit comprising a communications module adapted to relay sensor readings, or log files, to a remote monitoring station.

Suitably, the data sensing and/or logging means comprises any one or more of the group comprising: an oxygen sensor; a humidity sensor; a temperature sensor; a strain gauge; a weighing device; a location sensor; a GPS tracking device; an accelerometer; an electrostatic sensor; and a pressure sensor.

The powder container may further comprise a pilot line communicating with the interior of the pressure vessel and the outlet downstream of the outlet valve, a pilot line valve for selectively opening and closing the pilot line; and a bleed valve communicating with the outlet downstream of the outlet valve.

The use of a pressure vessel suitably enables the quantity of powder to be stored under a pressurised, controlled atmosphere. This enables the powder to be loaded into the container and stored in a controlled atmosphere, such as an inert gas (e.g. argon, nitrogen), which suitably inhibits corrosion, oxidation or other deterioration of the powder.

The outlet suitably comprises a connector, such as a flange or vacuum flange coupling (sometimes referred to as a KF flange coupling), which enables the outlet of the container to be connected directly to the inlet port of an AM machine. A manifold, adapter or other interconnector may be provided to enable the container to fit to a range of AM machine inlets. The AM machine inlet typically comprises an inlet valve between the inlet port and the AM machine itself. Thus, by connecting the container to an AM machine with the container's outlet valve closed, and the AM machine's inlet valve closed, a closed volume of air can be trapped between the outlet valve of the container and the inlet valve of the AM machine.

The pilot line communicates between interior of the container's pressure vessel (which contains a pressurised controlled atmosphere) and the container's outlet downstream of the container's outlet valve. Thus, when the container is connected to an AM machine, it is possible to open the pilot line valve to allow quantity of pressurised gas to fill the void between the container's outlet valve and the AM machine's inlet valve. By also opening the container's bleed valve, it is possible to purge the void between the container's outlet and the AM machine's inlet, using pressurised gas from within the pressure vessel to do so. Once purged, the pilot line valve and the bleed valve can be closed, at which point, the void between the container's outlet valve and the AM machine's inlet valve will contain a quantity of the controlled atmosphere. Then, the container's outlet valve and the AM machine's inlet valve can be opened to allow powder to flow from the container into the AM machine.

An interlock device may be provided between the container and an AM machine to which it will be connected. The interlock device may be configured to prevent opening the container into the AM device if certain parameters are out of range, for example, if there is contamination, an overpressure, excessive moisture, excessive oxygen etc. in the container's outlet. Such a configuration can assist in reducing human error and the likelihood of accidental damage to, or contamination of, the AM machine.

It will be appreciated that the use of a pressure vessel containing a pressurised controlled atmosphere provides two main functions: first, it preserves the powder in a desired condition, thus improving its shelf life and better ensuring that it arrives on-site in a desired/specified condition; and second, it enables the controlled atmosphere within the pressure vessel to be used to purge the interface between the container and AM machine, thereby reducing the likelihood of contamination of the powder by air or gasses from the surrounding atmosphere or the AM machine. By using a pressurised controlled atmosphere, it is not always necessary to provide a supplementary supply of protective gas to purge the connection between the container and an AM machine.

Nevertheless, a supplementary gas supply may be provided, for example in the form of a pressurised gas cylinder that is connectable to the pressure vessel, or to the pilot line, via a control valve. A supplementary gas supply may be needed, for example, where the container is repeatedly connected to, and disconnected from, an AM machine, meaning that multiple purges are required thereby depleting the pressure of the controlled atmosphere within the pressure vessel: the supplementary gas supply may be used to top-up the pressure within the pressure vessel, or for purging only, depending on the specific requirements of the application.

The container comprises data sensing and/or logging means adapted to monitor and/or log various parameters of the powder and/or controlled atmosphere. The data sensing and/or logging means may comprise any one or more of the following: An oxygen sensor located within the pressure vessel for monitoring and/or logging the oxygen content of the controlled atmosphere. Suitably, the oxygen sensor can be configured to provide a warning if the oxygen level within the pressure vessel exceeds a threshold value, which may be deleterious to the powder, e.g. at a level sufficient to cause oxidation.

A humidity sensor located within the pressure vessel for monitoring and/or logging the moisture content of the controlled atmosphere. Suitably, the humidity sensor can be configured to provide a warning if the humidity or water level within the pressure vessel exceeds a threshold value, which may be deleterious to the powder, e.g. at a level sufficient to cause rusting.

A temperature sensor located within the pressure vessel for monitoring and/or logging the temperature of the powder and/or the controlled atmosphere. Suitably, the temperature sensor can be configured to provide a warning if the temperature exceeds, or falls below, upper and lower threshold values, which may occur, for example, during sea or air shipping.

A strain gauge or weighing device for monitoring and/or logging the weight of the contents of the pressure vessel. Suitably, the strain gauge or weighing device can be configured to provide an indication of the quantity of powder within the pressure vessel, and may be configured to alert operatives if the weight falls unexpectedly (indicating a leak or tampering, say) or if the weight falls below a threshold value (indicating that the container needs to be replaced imminently).

A location sensor, such as a GPS tracking device, adapted to monitor and/or log the location of the container during transit and/or to identify theft, tampering, hold-ups etc., which are important in relation to "just-in-time" delivery schedules/logistics.

An accelerometer, vibration sensor or gyroscope adapted to monitor and/or log movement of the container, and in particular, vibration and shocks. Such a sensor may enable operatives to identify rough treatment of the container during transit and/or to alert operatives to the potential for damage to the pressure vessel or other parts of the container. Further, excessive vibration can lead to compaction of the powder, which may lead to blockages in use. Thus, alerting operatives to the potential for blockages is a useful design feature of the invention.

A pressure sensor adapted to monitor and/or log the pressure of the controlled atmosphere within the pressure vessel. A pressure sensor suitably enables operatives to monitor the protective atmosphere pressure so that leaks can be detected or an indication can be obtained when the protective atmosphere pressure needs to be topped-up. The pressure sensor may be operatively connected to a supplementary gas supply, where provided, whereby the pressure of the controlled atmosphere can be topped-up automatically upon detection of the pressure falling below a threshold value.

An electrostatic sensor can be used to determine and/or predict whether the powder will readily flow from the container to the AM machine. It has been found that excessive static electricity in the powder can lead to blockages and/or poor flow characteristics, and by providing an electrostatic sensor, such deleterious effects can be identified, predicted and/or monitored.

In addition, the container may be provided with a mixer, which can be a mechanical agitator, such as a motorised blade adapted to move within the container to release compaction that may have occurred during storage or transportation. In alternative embodiments, the mixer may comprise one or more gas jetting systems, which can also be used to break-up blockages and compacted regions of the powder, which could also be employed to re-aerate the powder prior to use. Where a gat jet system is employed, this may comprise a pump adapted to recirculate the gas within the container, or it may be connected to an external gas supply, such as a container of pressurised gas.

The data sensing and/or logging means is operatively connected to a communications module, for example a GSM transmitter, which can send sensor readings to a remote monitoring station on a continuous or intermittent basis. The remote monitoring station may be configured to periodically poll the communications module (e.g. by sending an SMS message to it), whereupon the communications module replies, e.g. in a reply SMS message containing a list of sensor readings. The remote monitoring station may be configured to monitor many containers and to collate the data to identify trends across various containers' readings. For example, if a number of co-located containers report a temperature increase, this may be used to alert operatives of an HVAC failure in a remote warehousing facility, for example.

The container is suitably palletised, that is to say, mounted on an industry standard pallet system, which facilitates loading and transporting the container using fork-lift trucks, ISO container-compatible transport systems and the like. The pallet may additionally comprise a protective framework or chassis providing physical protection to the pressure vessel.

Preferred embodiments of the invention shall now be described, by way of example only, with reference to the accompanying drawings in which.

Figure 1:
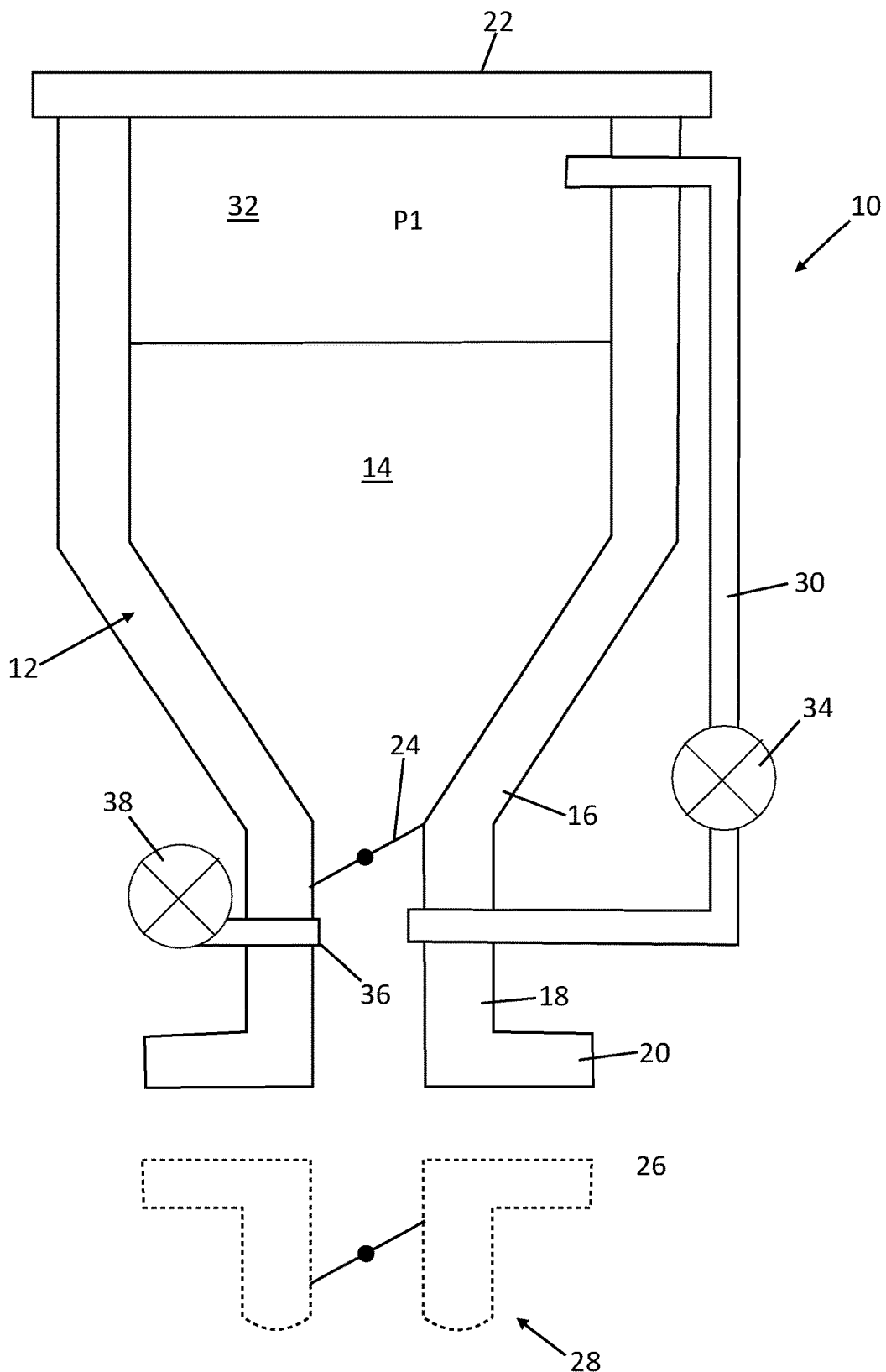
FIG. 1 is a schematic view of a container in accordance with the invention.

In FIG. 1, a container 10 in accordance with the invention comprises a pressure vessel 12 for storing a quantity of powder 14. The pressure vessel 12 comprises a part-conical main body portion 16 leading to an outlet tube 18, which terminates in a radially outwardly extending connection flange 20. The flange connector 20 of the outlet tube 18 can be connected to a complementary inlet flange 26 of an AM machine 28, as shall be described in greater detail below.

The pressure vessel 12 can be filled via a removable lid 22, which is sealingly bolted to the upper periphery of the main body 16. The outlet tube 18 comprises an outlet valve 24, which is configured to control or stop the flow of powder 14 from the pressure vessel into the outlet tube 18.

The container 10 further comprises a pilot line 30, which provides fluid communication between the pressure vessel 12 (specifically, a volume of gas 32 located above the level of the powder 14 within the vessel) and the outlet tube 18 at a location downstream of the outlet valve 24. An in-line pilot line valve 34 is provided as well.

The outlet tube 18 further comprises a bleed tube 36, which is selectively opened and closed by a bleed tube valve 38.

Figure 2:
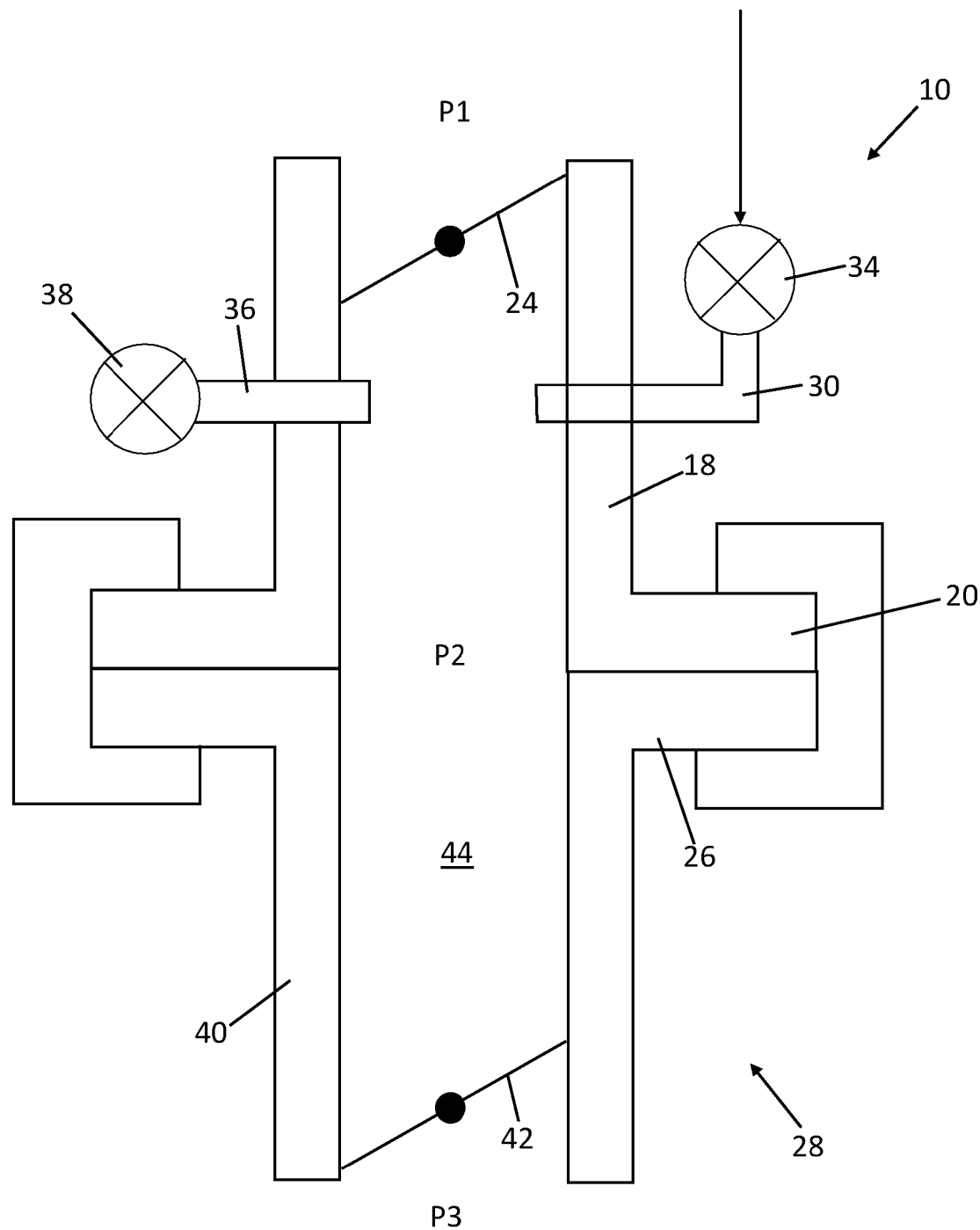
FIG. 2 is a schematic view of the coupling of the container of FIG. 1 with an AM machine.

Referring now to FIG. 2, the container 10 can be connected to an AM machine 28 by coupling the outlet tube 18 of the pressure vessel 12 to the inlet tube 40 of the AM machine 28. This achieved using a vacuum flange clamp, which clamps around the respective flanges 20, 26 of the container's outlet 18 and the AM machine's inlet 40. It can be seen that the AM machine's inlet 40 comprises an inlet valve 42 such that when the outlet valve 24 and inlet valve 42 are closed, a sealed interior volume 44 is formed by the outlet 18 of the container 10 and the inlet 40 of the AM machine 28.

Once the container 10 has been coupled to the AM machine 28, the pilot line valve 34 can be opened to allow the pressurised gas controlled atmosphere 32 to flow into the volume 44 until the two pressures P1, P2 equalise. The bleed valve 38 can then be opened to allow the gas 32 and air previously contained within the volume 44 to flow out, thereby purging the volume 44. Once purged, the pilot line valve 34 and the bleed valve 38 can be closed. In an optional step, the inlet valve 42 of the AM machine 28 can be opened to balance the pressure P2 within the volume 44 with that P3 of the AM machine 28, but this is optional.

Additionally or alternatively, an over-pressure can be preserved in the container, which can be used to release a blockage in the conduit. For example, where the powder at the base of the container becomes compacted in transit, an over-pressure in the container can be used to force the compacted powder through the outlet and/or to break-up a blockage when the outlet conduit is opened thereby forming a pressure differential across the blockage. This may be particularly useful, say, where the powder has been subjected to vibration during transit, which can lead to packing-down of the powder particles to reduce the interstitial spaces.

When the outlet valve 24 of the container 10 is opened, and the inlet valve 42 of the AM machine 28 is opened, powder 14 is able to flow between the container 10 and the AM machine until one or both valves 24, 42 are closed again.

It will be appreciated that by storing the powder 14 in a pressure vessel 12 under a pressurised controlled atmosphere 32, and by using the controlled atmosphere to purge the connection between the container 10 and the AM machine 28 prior to allowing the powder 14 to enter the AM machine 28, the powder 14 never comes into contact with the air. Such a configuration enables the powder condition to be guaranteed because the powder 14 is packed, stored and transported under controlled atmosphere conditions, and the controlled atmosphere 32 is preserved until the powder finally enters the AM machine 28. Thus, the only source of contamination is the gas within the AM machine 28, which is in any event, at the operator's discretion, and so the supply chain for the powder 14 can be much better controlled than with existing powder storage and transportation systems.

Of course, the system relies on having, and maintaining a sufficiently high pressure P1 within the pressure vessel 12, not only to preserve the powder 14, but also with enough excess gas to permit a desired number of purges (the controlled atmosphere is vented to the outside during purging, so some gas 32 will inevitably be lost).

For example, 100 kg of powder with a material density of 2750 kg/m3 would occupy, in a fully-dense state, 0.036 m3 of space. However, metal powders are not 100% dense, with a packing density of ~60% being typical. Thus, 100 kg of powder would occupy ~0.06 m3, or approximately 60.6 l of space. The pressure vessel may have a total internal volume of, say, 100 l, meaning that there is an empty volume of 39.4 l within the pressure vessel which would be filled with pressurised gas, for example, argon. Thus, the total empty volume of the pressure vessel would be the volume of empty space, plus the total volume of the interstices between the metal particles, which at a 60% packing factor, would be approximately 124.5 l.

Typically the volume 44 of the coupling might be ~2.35 l, and assuming that 10 purges were required, 23.5 additional litres of gas would be required, i.e. ~148 l of gas. However, the compressed volume of the gas is only ~60 l, so the pressure P1 required to meet these requirements would be ~2.35 bar. If 20 purges were anticipated, then the P1 requirement would be just ~2.72 bar. Thus, the hazard for transporting pressurised gas is relatively low, given the relatively low P1 pressure involved.

Figure 3:
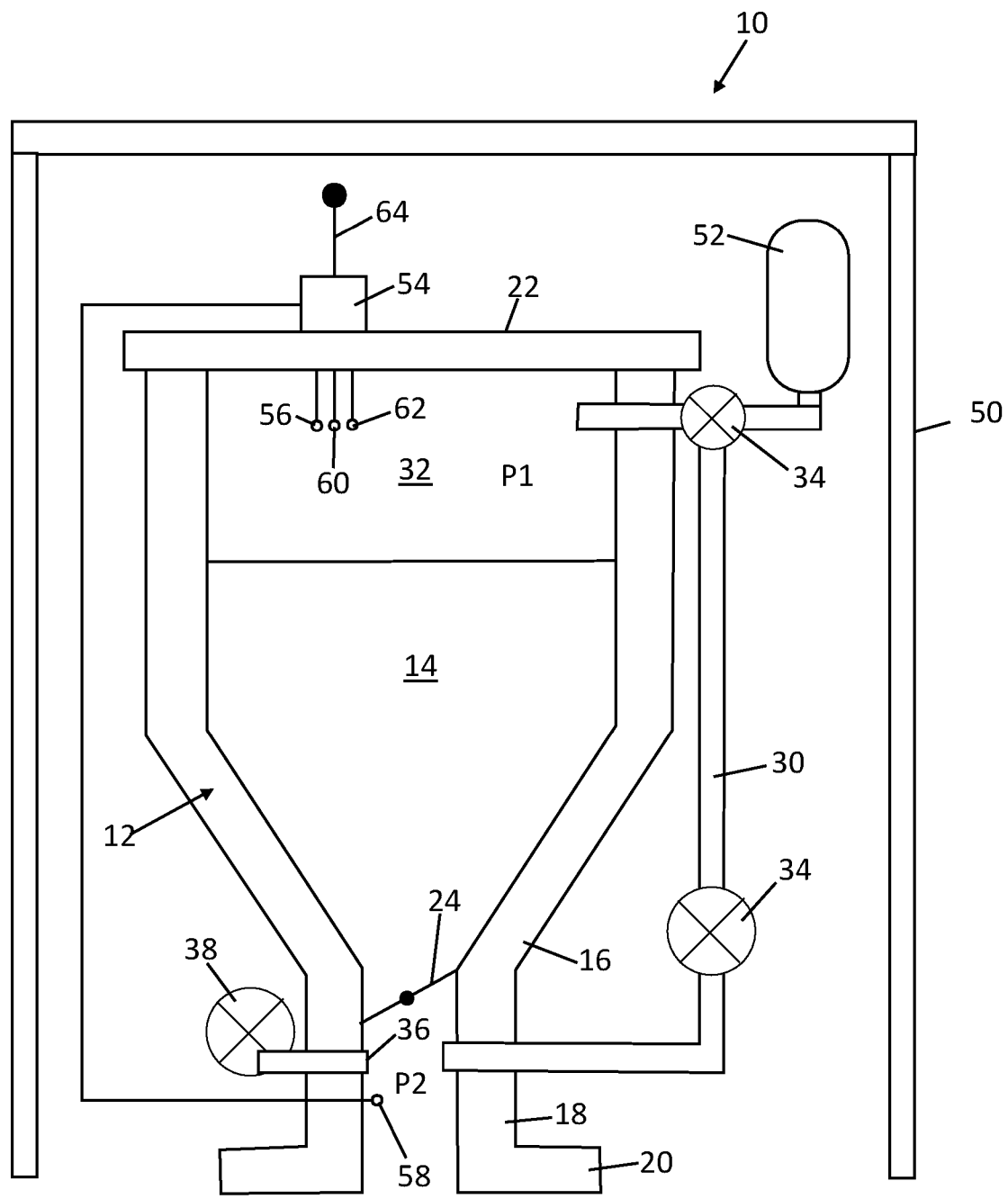
FIG. 3 is a schematic view of a second container in accordance with the invention.

Turning now to FIG. 3 of the drawings, which shows a more complicated version of the invention 10, the container 10 is mounted in a palletised support chassis 50, which surrounds, and provides mechanical protection for, the pressure vessel 12. The chassis 50 also facilitates lifting and moving the container 10. It will be noted, in this embodiment, that the pilot line valve 34 comprises a three-way diverter valve enabling the pilot line 30 to be selectively closed, or connected to the interior volume 32 of the pressure vessel 12, or to a top-up gas supply, in the form of a small gas canister 52. The pilot line valve 34 is computer controlled via a control unit 54, which is connected to pressure sensors 56, 58 located within the pressure vessel 12 and the outlet tube 18, respectively. The control unit 54 is also connected to a moisture sensor 60 and oxygen sensor 62. The control unit 54 comprises a module (e.g. a PIC and memory device) adapted record and log the sensor readings either continuously, or at intervals. The control unit 54 also comprise a GSM module (not shown) a GPS unit (not shown) and an antenna 64 for relying sensor readings, or log files, to a remote monitoring station, either ad hoc, at intervals, or on-demand.

It will be readily appreciated from the foregoing that the invention provides a solution to many of the problems associated with the supply chain for AM powders, or other bulk powders. The scope of the invention is defined by the appendent claim, but is not restricted to the details of the foregoing embodiments, which are merely exemplary.

The following statements are not the claims, but relate to various embodiments of the invention:

Statement 1. A powder container comprising a pressure vessel for containing a quantity of powder and a quantity of pressurised gas, an outlet through which, in use, the powder can flow out of the pressure vessel, and an outlet valve for selectively opening and closing the outlet, wherein the container further comprises a data sensing and/or logging means adapted to monitor and/or log various parameters of the powder and/or the pressurised gas.

Statement 2. The container of claim 1, wherein the data sensing and/or logging means comprises any one or more of the group comprising: an oxygen sensor; a humidity sensor; a temperature sensor; a strain gauge; a weighing device; a location sensor; a GPS tracking device; an accelerometer; an electrostatic sensor; and a pressure sensor.

Statement 3. The container of statement 1 or statement 2, comprising a control unit adapted record and log the sensor readings either continuously, or at intervals.

Statement 4. The container of statement 3, wherein the control unit comprises a communications module adapted to relay sensor readings, or log files, to a remote monitoring station.

Statement 5. The container of statement 4, wherein the communications module comprises a GSM transceiver.

Statement 6. The container of any preceding statement, further comprising a pilot line communicating with the interior of the pressure vessel and the outlet downstream of the outlet valve; a pilot line valve for selectively opening and closing the pilot line; and a bleed valve communicating with the outlet downstream of the outlet valve.

Statement 7. The container of statement 6, further comprising a supplementary gas supply connected to the pilot line.

Statement 8. The container of statement 7, wherein the pilot line valve comprises a three-way valve for selectively closing the pilot line, or for selectively connecting the supplementary gas supply to either or both of the interior of the pressure vessel and the outlet downstream of the outlet valve.

Statement 9. The container of statement 7 or statement 8, wherein the supplementary gas supply comprises a pressurised gas canister.

Statement 10. The container of any of statements 6 to 9, wherein the pilot line communicates, in use, with a volume of gas within the pressure vessel located above the level of the powder in the vessel.

Statement 11. A powder container comprising a pressure vessel for containing a quantity of powder and a quantity of pressurised gas, an outlet through which, in use, the powder can flow out of the pressure vessel, and an outlet valve for selectively opening and closing the outlet, wherein the container further comprises a pilot line communicating with the interior of the pressure vessel and the outlet downstream of the outlet valve; a pilot line valve for selectively opening and closing the pilot line; and a bleed valve communicating with the outlet downstream of the outlet valve.

Statement 12. The container of statement 11, further comprising a supplementary gas supply connected to the pilot line.

Statement 13. The container of statement 12, wherein the pilot line valve comprises a three-way valve for selectively closing the pilot line, or for selectively connecting the supplementary gas supply to either or both of the interior of the pressure vessel and the outlet downstream of the outlet valve.

Statement 14. The container of statement 12 or statement 13, wherein the supplementary gas supply comprises a pressurised gas canister.

Statement 15. The container of any preceding statement, wherein the pressure vessel comprises a part-conical main body portion leading to the outlet.

Statement 16. The container of any preceding statement, wherein the outlet comprises an outlet tube, which terminates in a radially outwardly extending connection flange.

Statement 17. The container of any preceding statement, wherein the pressure vessel comprises a removable lid, which is sealingly affixable, in use, to an upper periphery of the pressure vessel.

Statement 18. The container of any of statements 6 to 17, wherein the pilot line communicates, in use, with a volume of gas within the pressure vessel located above the level of the powder in the vessel.

Statement 19. The container of any preceding statement, wherein the pressure vessel is adapted in use, to withstand an internal pressure of up to 5 bar.

Statement 20. The container of any preceding statement, wherein the pressure vessel is adapted in use, to withstand an internal pressure of up to 3 bar.

Statement 21. The container of any preceding statement, further comprising a palletised support chassis.

Statement 22. The container of any of statements 11 to 21, further comprising data sensing and/or logging means adapted to monitor and/or log various parameters of the powder and/or the pressurised gas.

Statement 23. The container of statement 22, wherein the data sensing and/or logging means comprises any one or more of the group comprising: an oxygen sensor; a humidity sensor; a temperature sensor; a strain gauge; a weighing device; a location sensor; a GPS tracking device; an accelerometer; and a pressure sensor.

Statement 24. The container of statement 22 or statement 23, comprising a control unit adapted record and log the sensor readings either continuously, or at intervals.

Statement 25. The container of statement 24, wherein the control unit comprises a communications module adapted to relay sensor readings, or log files, to a remote monitoring station.

Statement 26. The container of statement 25, wherein the communications module comprises a GSM transceiver.

Statement 27. A system comprising a container according to any preceding statement, and an additive manufacturing machine comprising an inlet adapted to connect to the outlet of the container.

Statement 28. The system of statement 27 wherein the inlet of the additive manufacturing machine comprises an inlet valve configured such that when the outlet valve and inlet valve are closed, a sealed interior volume is formed by the outlet of the container and the inlet of the AM machine.

Statement 29. The system of statement 27 or statement 28, wherein when the outlet valve of the container is opened, and the inlet valve of the AM machine is opened, powder is able to flow between the container and the AM machine.

Statement 30. The system of any of statements 27, 28 or 29, wherein the pilot line valve is computer controlled via a control unit, which is connected to pressure sensors located within the pressure vessel and the outlet tube.

Statement 31. A system comprising a container according to any preceding statement and a remote monitoring station configured to periodically poll the communications module for sensor readings.

Statement 32. The system of statement 32, wherein the remote monitoring station is configured to send an SMS message to the container, whereupon the communications module replies via an SMS message containing a list of sensor readings or log files.

Statement 33. The system of statement 32 or statement 32, wherein the remote monitoring station is configured to monitor many containers and to collate the data to identify trends across various containers' readings.

Statement 34. A container or system substantially as hereinbefore described, with reference to, and as illustrated in, the accompanying drawings.

What is claimed is:
1. A powder transport container comprising:
a pressure vessel containing a quantity of metal powder for additive manufacturing and a quantity of inert pressurised gas, wherein the metal powder and the inert pressurised gas are contained within the pressure vessel;

a part-conical main body portion;
an outlet through which, in use, the powder can flow out of the pressure vessel; an outlet valve for selectively opening and closing the outlet;
a data sensing and/or logging means adapted to monitor and/or log various parameters of the powder and/or the pressurised gas; and
a control unit adapted to record and log the sensor readings either continuously, or at intervals, the control unit comprising a communications module adapted to relay sensor readings, or log files, to a remote monitoring station, wherein the data sensing and/or logging means comprises an oxygen sensor.

2. The container of claim 1, wherein the data sensing and/or logging means additionally comprises one or more of the group consisting of: a humidity sensor; a temperature sensor; a strain gauge; a weighing device; a location sensor; a GPS tracking device; an accelerometer; an electrostatic sensor; and a pressure sensor.

3. The container according to claim 1, further comprising a pilot line communicating with an interior of the pressure vessel and the outlet downstream of the outlet valve; a pilot line valve for selectively opening and closing the pilot line; and a bleed valve communicating with the outlet downstream of the outlet valve.

4. The container according to claim 3, wherein the pilot line valve comprises a three-way valve for selectively closing a pilot line, or for selectively connecting a supplementary gas supply to either or both of the interior of the pressure vessel and the outlet downstream of the outlet valve.

5. The container according to claim 3, wherein the pilot line communicates, in use, with a volume of gas within the pressure vessel located above a level of the powder in the vessel.

6. The container of claim 1, further comprising a supplementary gas supply connected to the pressure vessel.

7. The container of claim 1, wherein the part-conical main body portion leads to the outlet.

8. The container of claim 1, wherein the outlet of the container is adapted to connect to an inlet of an additive manufacturing machine.

9. A powder transport container comprising:
a pressure vessel;
a quantity of metal powder for additive manufacturing and a quantity of inert pressurised gas, wherein the metal powder and the inert pressurised gas are contained within the pressure vessel;
a part-conical main body portion;
an outlet through which, in use, the powder can flow out of the pressure vessel; an outlet valve for selectively opening and closing the outlet;
a data sensing and/or logging means adapted to monitor and/or log various parameters of the powder and/or the pressurised gas; and
a control unit adapted to record and log the sensor readings either continuously, or at intervals, the control unit comprising a communications module adapted to relay sensor readings, or log files, to a remote monitoring station, wherein the data sensing and/or logging means comprises an oxygen sensor and a humidity sensor.

10. The container of claim 9, wherein the data sensing and/or logging means additionally comprises one or more of the is selected from the group consisting of: a temperature sensor; a strain gauge; a weighing device; a location sensor; a GPS tracking device; an accelerometer; an electrostatic sensor; and a pressure sensor.

11. The container according to claim 9, further comprising a pilot line communicating with an interior of the pressure vessel and the outlet downstream of the outlet valve; a pilot line valve for selectively opening and closing the pilot line; and a bleed valve communicating with the outlet downstream of the outlet valve.

12. The container according to claim 11, wherein the pilot line valve comprises a three-way valve for selectively closing a pilot line, or for selectively connecting a supplementary gas supply to either or both of the interior of the pressure vessel and the outlet downstream of the outlet valve.

13. The container according to claim 11, wherein the pilot line communicates, in use, with a volume of gas within the pressure vessel located above a level of the powder in the vessel.

14. The container of claim 9, further comprising a supplementary gas supply connected to the pressure vessel.

15. The container of claim 9, wherein the part-conical main body portion leads to the outlet.

16. The container of claim 9, wherein the outlet of the container is adapted to connect to an inlet of an additive manufacturing machine.

* * * * *